United States Patent [19]

Becker et al.

[11] Patent Number: 4,713,604

[45] Date of Patent: Dec. 15, 1987

[54] MONITORING DEVICE FOR DETECTING FAULTS IN AN ELECTRICAL DEVICE, PARTICULARLY IN AN LC FILTER CIRCUIT IN AN AC VOLTAGE NETWORK

[75] Inventors: Michael Becker, Uttenreuth; Klaus Renz, Nuremberg, both of Fed. Rep. of Germany

[73] Assignee: Siemens Aktiengesellschaft, Munich, Fed. Rep. of Germany

[21] Appl. No.: 721,600

[22] Filed: Apr. 10, 1985

[30] Foreign Application Priority Data

Jun. 29, 1984 [DE] Fed. Rep. of Germany ....... 3424082

[51] Int. Cl.[4] .................. G01R 31/02; H01G 1/11; H02H 3/38
[52] U.S. Cl. .................................. 324/500; 324/60 C; 361/15; 361/42; 361/79
[58] Field of Search ............... 324/51, 60 C, 60 R, 324/427, 57 R, 57 Q, 433, 133; 361/15, 17, 42, 79, 80; 340/660–663

[56] References Cited

U.S. PATENT DOCUMENTS

| | | | |
|---|---|---|---|
| 4,027,231 | 5/1977 | Lohrmann | 324/133 X |
| 4,401,942 | 8/1983 | Renz | 324/427 |
| 4,409,542 | 10/1983 | Becker et al. | 324/57 Q |

FOREIGN PATENT DOCUMENTS 0040766 12/1981 European Pat. Off. ......... 324/60 C
3020128 12/1981 Fed. Rep. of Germany .

Primary Examiner—Reinhard J. Eisenzopf
Assistant Examiner—Jack B. Harvey
Attorney, Agent, or Firm—Kenyon & Kenyon

[57] ABSTRACT

A monitoring device connected to an LC filter circuit for determining the occurrence of faults therein includes sensors for measuring the voltage drop across the LC filter circuit and the current flow therethrough. The monitoring device includes simulation circuits for estimating the voltage drop and current flow in response to the actual values of the current flow and voltage drop, respectively. In one position of the double-throw switch, the actual value of the current is compared with an estimated value thereof while in another position of the double-throw switch, an estimated value of the voltage drop is compared with the actual value thereof. Differences between the compared values are detected by a multiplicity of Y-connected limit and counting stages activatable by voltages of different magnitudes and directions for indicating different kinds of faults and for selectively disconnecting the LC filter circuit from a power supply network.

5 Claims, 5 Drawing Figures

MONITORING DEVICE FOR DETECTING FAULTS IN AN ELECTRICAL DEVICE, PARTICULARLY IN AN LC FILTER CIRCUIT IN AN AC VOLTAGE NETWORK

BACKGROUND OF THE INVENTION

This invention relates to a monitoring device operatively connectable to an electrical device, such as an LC filter or a capacitor battery, for evaluation of internal faults therein causing changes in impedance. The electrical device is connected to an electric power supply network via a switch which may be opened by the monitoring device upon the detection of a fault of a predetermined nature.

German Patent Document (Offenlegungsschrift) No. 30 20 128 discloses a monitoring device for detecting faults in a capacitor battery comprising a multiplicity of parallel capacitor circuits connected in series to one another. Each capacitor circuit comprises a multiplicity of parallel circuit legs each including a capacitor component connected in series to a respective fuse. The capacitor battery is connected to a power supply network.

Upon the short circuit of an individual capacitor in a capacitor battery, the associated fuse reacts to form an open circuit. The monitoring device of Offenlegungsschrift No. 30 20 128 detects such internal defects without differentation and indicates their occurrence separately in accordance with their relative positions in time. The monitoring device also indicates to an operator the total number of defects. Thus, for example, a first defect is indicated in the same manner and by the same indicating device, regardless of the nature of the defect. A second defect is similarly signaled by a second indicating device with no specification as to the type of fault. It is frequently left to the judgment of operating personnel whether the electrical device being monitored is to be disconnected from the power supply network. As set forth in Offenlegungsschrift No. 30 20 128, the electrical device may be automatically disconnected upon the occurrence of two or more faults.

The monitoring device disclosed in Offenlegungsschrift No. 30 20 128 comprises current and voltage transformers operatively connected to the capacitor battery for sensing the voltage drop thereacross and the current flow therethrough. An electronic simulation circuit is connected to the current transformer for generating an estimated value of the voltage drop across the capacitor battery, whereby the so-called "observer principle" may be applied. The electronic simulation circuit is based upon the equivalent circuit of the capacitor battery. The simulation circuit is designed to compensate for slow changes in the electrical operating characteristics of the capacitor battery, such changes arising from aging influences, temperature influences and other normal external influences.

In order to detect abrupt changes in the operating state of the capacitor battery due to internal faults thereof, the fundamental frequency of the actual voltage drop across the capacitor battery and the fundamental frequency of the estimated voltage drop across the capacitor battery are extracted by filters and are subsequently converted into amplitude-proportional d-c voltages. These d-c voltages are transmitted to a transient comparator circuit operating as a nonlinear control device. The transient comparator circuit detects differences between the rectified fundamental frequencies of the actual and the estimated voltage drop across the compacitor battery, the differences resulting from internal faults in the battery. The differences detected by the transient comparator circuit are evaluated at the output thereof, the evaluation being directed only to number of faults and not to their types. Indication of the first, second and other faults is accomplished via separate indicating devices, while the capacitor battery can be disconnected from the power supply network automatically if two or more faults occur.

The fact that the manual or automatic disconnection of the capacitor battery from the power supply network may be accomplished on the basis of the number of faults without regard to the type of faults can lead either to premature disconnection in the case of essentially harmless defects or to late disconnection in the case that a singly occurring fault is serious.

The monitoring device disclosed in Offenlegungsschrift No. 30 20 128 also works in cases where the changes in input voltage are large and fast. However, the monitoring device cannot be used to protect other kinds of electrical devices such as LC filter circuits and electrical machines.

An object of the present invention is to provide an improved monitoring device of the above-described type for protecting electrical devices which have inductive and/or ohmic components, as well as capacitive components.

Another, more particular object of the present invention is to provide such a monitoring device in which not only the number of faults, but also the type of faults can be determined, whereby selective measures may be undertaken for automatically tripping a network switch to disconnect the protected device from a power supply network.

SUMMARY OF THE INVENTION

A monitoring device in accordance with the present invention is connectable to an electrical device for evaluating internal faults therein causing changes in impedance. The electrical device is connected to an electrical supply network via a network switch.

In accordance with the present invention, the monitoring device comprises in combination a voltage sensor, a current sensor, a simulation or estimation circuit, a filter, a rectifier, a transient comparator circuit, a multiplicity of limit and counting stages, and indicating and tripping components. The sensors are operatively couplable to the monitored electrical device for sensing the voltage drop thereacross and the current flow therethrough. The simulation or estimation circuit is operatively linked to the sensors for generating estimated values of the voltage drop and current flow through the electrical device from actual current and voltage values. The filter is operatively connected to the simulation circuit for filtering out fundamental frequencies of the estimated and actual values of the voltage drop across the electrical device and the current flow therethrough. The rectifier, operatively coupled to the filter, converts the fundamental frequencies into amplitude-proportional direct-current voltages. The transient comparator circuit is operatively tied to the rectifier for comparing a d-c voltage corresponding to the estimated value of the voltage drop across the electrical device with a d-c voltage corresponding to the actual value of such voltage drop. The comparator circuit also compares a d-c voltage corresponding to the estimated value of the current flow through the electrical device with a d-c voltage corresponding to the actual value of that current flow. The comparator circuit generates signals upon detecting a substantially sudden deviation between respective compared values. The indicating and tripping devices are operatively tied tot he comparator circuit via the limit and counting stages for generating in response to signals from the comparator circuit an operator-alert signal indicative of the functional status of the electrical device and for opening the network switch and thereby disconnecting the electrical device from the power supply network upon the occurrence of a predetermined fault condition. The limit and counting stages are connected in a Y configuration to one another and are responsive to respective threshold voltages of predetermined different magnitudes and directions for enabling the selective evaluation of internal faults of the electrical device being monitored.

A monitoring device according to the present invention is capable of detecting faults of different types, owing in part to the responsiveness of the limit and counting stages to voltages of different magnitudes and directions. The monitoring device is sensitive to the occurrence of defects in electrical devices having inductive and ohmic components as well as capacitive components, this sensitivity arising in part from the operation of the simulation circuit to generate estimated values of the current flowing through the electrical device and of the voltage drop thereacross.

In accordance with another feature of the present invention, the monitoring device is capable of detecting the faults in an electrical device comprising an LC filter circuit including a capacitor battery and a choke in the form of an inductor connected in series to one another. The capacitor battery includes a plurality of capacitor circuits connected in series to one another, each of the capacitors circuits including a plurality of capacitor components connected in parallel to one another. Pursuant to this particular feature of the present invention, the simulation or estimation circuit includes a first intermediate circuit connectable to the voltage sensor for simulating the operation of the LC filter circuit and a second intermediate circuit connectable to the current sensor for simulating the operation of the capacitor battery. The simulation circuit further includes a switch operatively linked to the sensors and to the intermediate circuits for alternately linking the voltage sensor to the first intermediate sensor and the current sensor to the second intermediate circuit.

This particular embodiment of the invention, and in particular of the simulator circuit, enables the use of the monitoring device for capacitor batteries as well as for LC filter circuits which contain capacitor batteries.

Instead of connecting fuses in series with individual capacitors in the legs of a capacitor battery, fuses can be assigned to individual capacitor windings within each capacitor. By cross connecting the legs between the series-connected capacitors, row of capacitors are produced.

DETAILED DESCRIPTION

Figure 1:
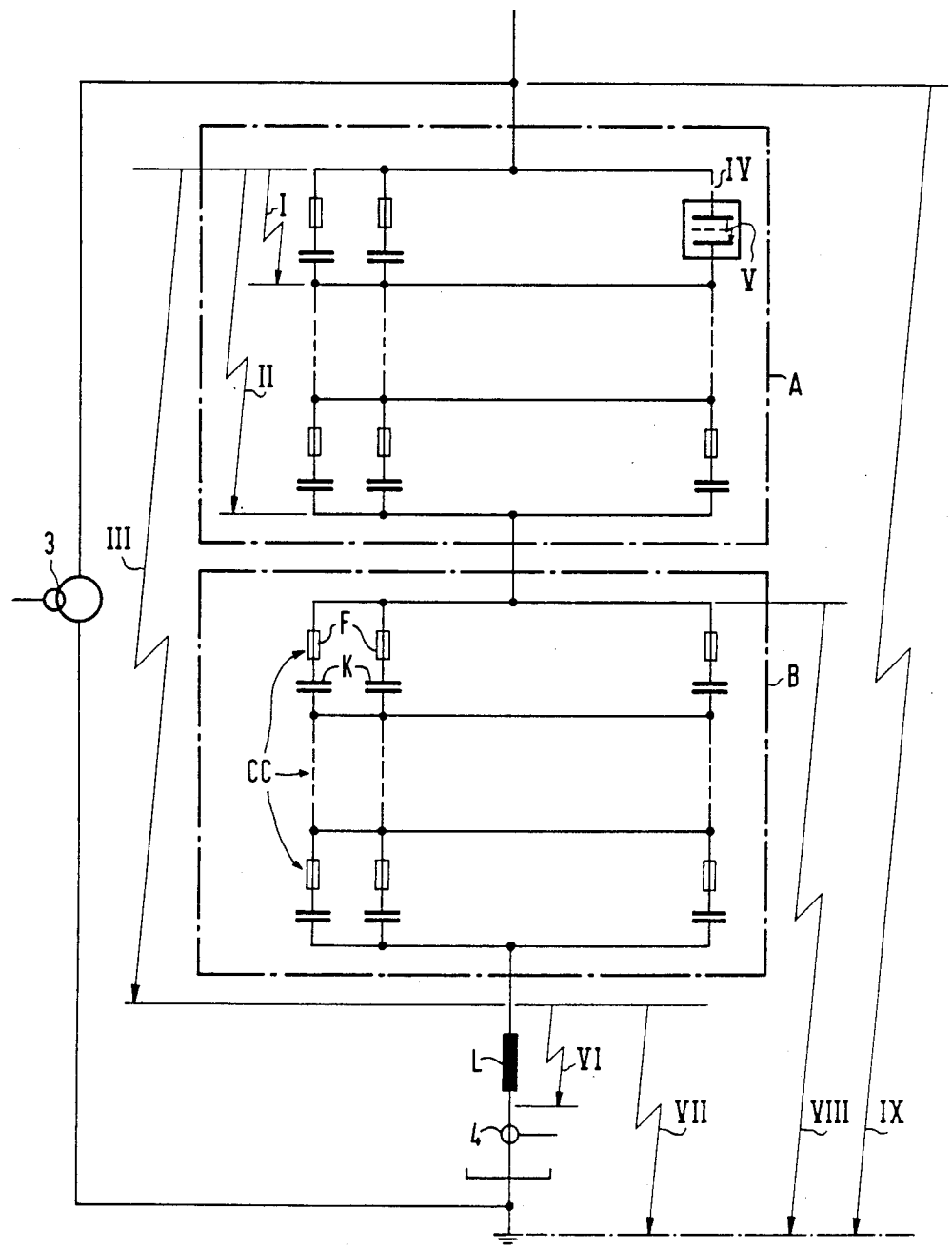
FIG. 1 is a diagram of an LC filter including a capacitor battery consisting of two separate insulated capacitor battery sections, showing different types of possible faults for the LC filter circuit.

As illustrated in FIG. 1, an LC filter circuit (See FIG. 2) comprises a pair of capacitor battery sections A and B connected in series to one another and to a choke in the form of an inductor L. The LC filter circuit is connected at one end to an electrical power supply network and at another end to ground. Each capacitor battery section A and B includes a plurality of capacitor circuits CC connected in series to one another. Each capacitor circuit CC includes a multiplicity of circuit legs or portions connected in parallel to one another, each such circuit portion comprising a capacitor component, such as an individual capacitor winding, in series with a respective fuse.

Faults in the capacitor battery sections A and B result in a reactance change $\Delta X$ having a direction along the reactance axis. Such reactance changes $\Delta X$ are either positive ($\Delta X$ greater than 0) or negative ($\Delta X$ less than 0).

Kinds of faults which can take place in an LC filter circuit are listed in TABLE I, along with the direction and magnitude of the corresponding reactance change $\Delta X$. The magnitude of the reactance change is indicated by the number of arrowhead symbols. Each fault I–IX is associated with a correspondingly designated portion of the LC filter circuit illustrated in FIG. 1.

TABLE I

| FAULT | TYPE OF FAULT | REACTANCE CHANGE |
|---|---|---|
| I | Row short circuit | $\Delta X << 0$ |
| II | Table short circuit (A) | $\Delta X <<< 0$ |
| III | Table short circuit (B) | $\Delta X <<<< 0$ |
| IV | Disconnection of capacitors | $\Delta X > 0$ |
| V | Capacitor short circuit | $\Delta X < 0$ |
| VI | Choke short circuit | $\Delta X > 0$ |
| VII | Choke short to ground | $\Delta X > 0$ |
| VIII | Table short to ground (B) | $\Delta X <<< 0$ |
| IX | Table short to ground (A) | $\Delta X = -X$ |

Faults I, II, III and V each have a positive reactance change. The magnitudes of the respective reactance changes differ sufficiently from each other to enable the particular type of fault to be determined by a monitoring circuit in accordance with the present invention.

Faults IV and VI are characterized in that the direction of their reactance changes is different from the direction of the reactance changes for faults I–III and V. Faults VII–IX share a common criterion of missing a measured-current indication, owing to current transformer 4 being shorted.

Figure 2:
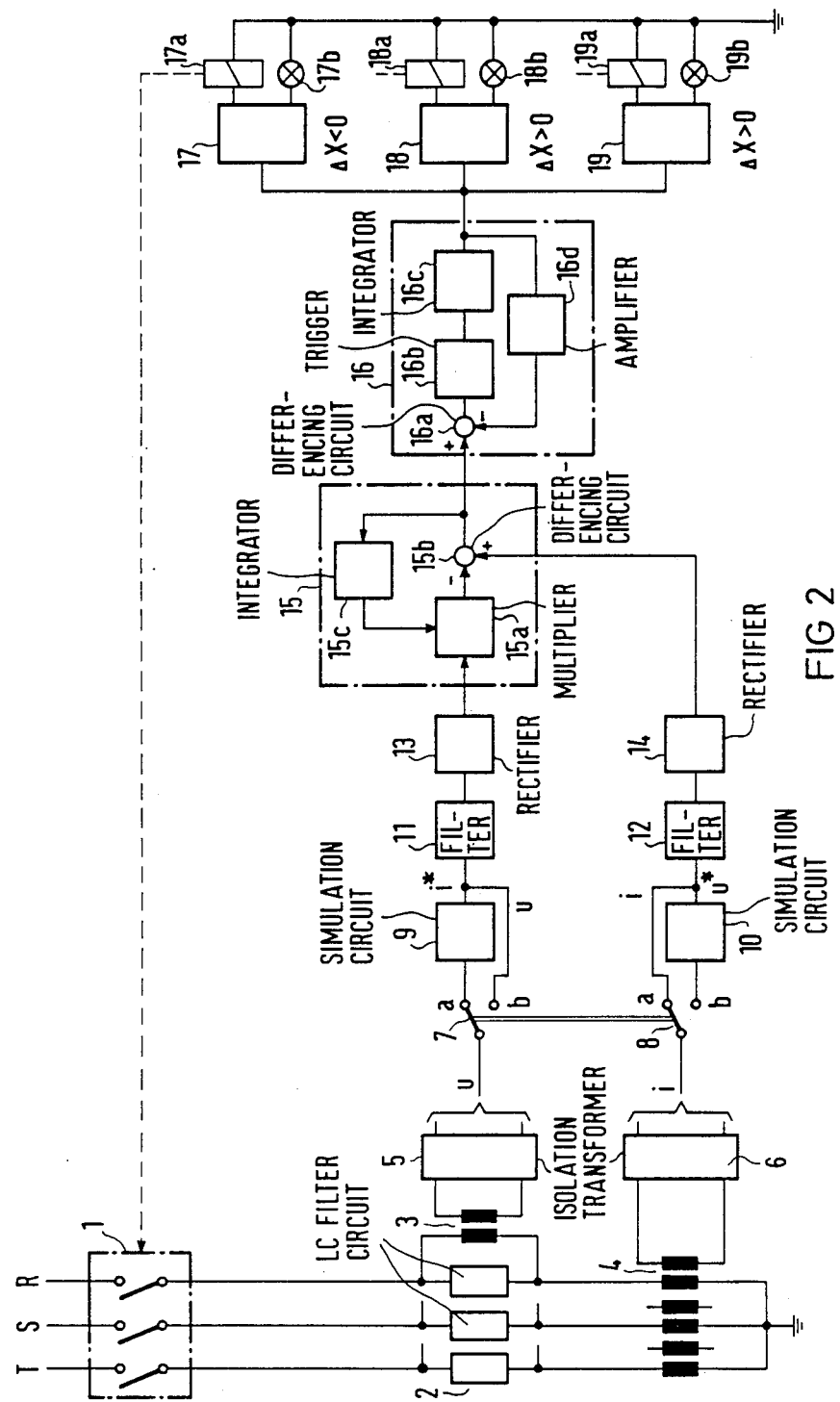
FIG. 2 is a block diagram of a switchable monitoring device in accordance with the present invention.

As illustrated in FIG. 2, three LC filter circuits 2 are coupled at one end to one another in a Y-connection or star configuration and at an opposite end to respective lines R, S and T of a three-phase power network. The common connection point, i.e., the Y junction, of the three LC filter circuits 2 is grounded.

FIG. 2 shows a monitoring device in accordance with the present invention for one of the LC filter circuits 2. It is to be understood that each of the LC filter circuits has a monitoring device as illustrated in FIG. 2.

In accordance with the invention, a monitoring circuit includes electronic simulation or estimation circuits 9 and 10 which are intermediately disposed between a voltage sensor 3 and a current sensor 4, on the one hand, and a transient comparator circuit 15, on the other hand. Voltage sensor 3 takes the form of a transformer connected across the respective LC filter circuit 2 (see FIG. 1) for measuring the voltage drop across the device to be protected. The voltage measured by the voltage sensor or transformer 3 is converted by an isolation transformer 5 to a potential level appropriate to the electronic components of the monitoring device and is fed via a double-throw switch 7 either to simulation circuit 9 (position 7a of switch 7) or directly to a filter 11 (position 7b) connected to an output of simulation circuit 9. Filter 11 functions to filter out the fundamental frequency of an input signal while suppressing the harmonics thereof. Filter 11 is connected at an output to a rectifier 13, whereby a fundamental frequency signal at the output of the filter 11 is converted into a d-c voltage having a level which is proportional to the amplitude of the fundamental frequency.

Current sensor 4 takes the form of a measuring transformer connected to an isolation transformer 6 in turn coupled to a filter 12 either directly or indirectly via simulation circuit 10, depending on whether a double-throw switch 8 is in one position 8a or another position 8b. Filter 12 extracts the fundamental frequency from its a-c input signal and transmits the fundamental frequency to a rectifier 14. Rectifier 14 converts the incoming a-c signal into a d-c signal having a voltage level proportional to the amplitude of the fundamental frequency signal at the output of filter 12.

The d-c signals from rectifiers 13 and 14 are transmitted to a nonlinear control circuit in the form of transient comparator circuit 15 which includes a multiplier 15a, a differencing circuit 15b and an integrator 15c. In particular, the d-c voltage at the output of rectifier 13 is fed to an input of multiplier 15a, while the d-c voltage at the output of rectifier 14 is fed to differencing circuit 15b. The multiplier is connected at an output to an inverting input of differencing circuit 15b, the output signal thereof being in turn fed to an input of multiplier 15a via integrator 15c. The operator of comparator circuit 15 is described in Offenlegungsschrift No. 30 20 128 and will not be described further herein. The internal structures of filters 11 and 12 and the operations thereof are also set forth in the Offenlegungsschrift.

As shown in FIG. 1, when switches 7 and 8 are in positions 7a and 8a, respectively, the actual voltage drop u across the respective LC filter circuit is fed to simulation circuit 9 which generates as estimated value i* of the current flowing therethrough. Simultaneously, the measured value of the actual current i flowing through the LC filter circuit is fed to filter 12 and converted in rectifier 14 to a d-c signal corresponding to the actual current. This actual-current signal is fed to comparator circuit 15 for comparison with the filtered and rectified estimated current value i*.

When switches 7 and 8 are in positions 7b and 8b, respectively, comparator circuit 15 receives from rectifiers 13 and 14 d-c voltages corresponding to the actual voltage drop u and an estimated voltage value u* produced by simulation circuit 10. In response to the signals at its inputs, comparator circuit 15 generates a signal having a magnitude and direction corresponding to the difference between the input signals.

To prevent brief disturbances in the operation of the LC filter circuit 2 from causing an erroneous malfunction determination, comparator circuit 15 is connected to a time delay stage 16 comprising a differencing circuit 16a, a trigger circuit 16b, an integrator 16c and a proportional amplifier 16d. The operation of time delay stage 16 is described in Offenlegungsschrift No. 30 20 128.

To the output of time delay stage 16 are connected, in a Y configuration, a multiplicity of limit and counting stages 17, 18 and 19 each responsive to threshold voltages of different magnitudes and directions and each connected at an output to a respective indicating device 17b, 18b and 19b as well as to respective tripping devices (relays) 17a, 18a and 19a. Relays 17a, 18a and 19a are operatively connected to network switch 1 for opening a common switch element thereof under the control of the respective limit and counting stage 17, 18 and 19. Tripping devices 17a, 18a and 19a may be energized independently of the type of fault or may be energized upon the occurrence of a predetermined fault condition identified by a particular magnitude and direction of the voltage difference at the output of comparator circuit 15 and delay circuit 16.

Figure 3:
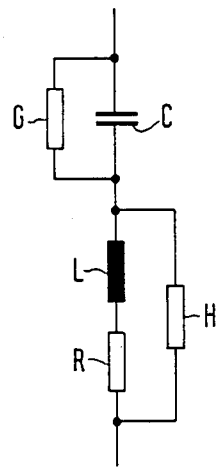
FIG. 3 is a diagram of an equivalent circuit for an LC filter circuit.

As illustrated in FIG. 3, an equivalent circuit for an LC filter circuit 2 (FIGS. 1 and 2) includes a capacitor C connected in series to the inductor L of the LC filter circuit and to a resistor R. A first current source G is connected across the terminals of the capacitor C, while a second current source H is connected in parallel to the series circuit consisting of inductor L and resistor R.

Figure 4:
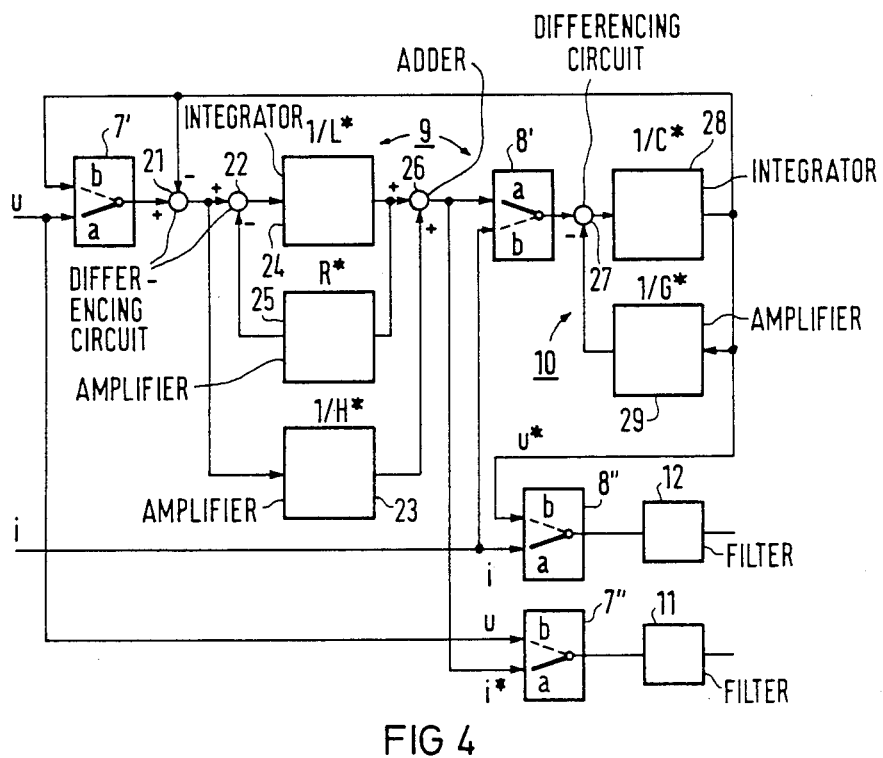
FIG. 4 is a block diagram of a simulation or estimation circuit for an LC filter, which circuit can be switched for simulating the operation of a capacitor battery alone.

FIG. 4 illustrates a particular embodiment of simulation circuits 9 and 10 (see FIG. 2), together with the double-switches 7 and 8. Generally, simulation circuit 9 is based upon the equivalent circuit illustrated in FIG. 3, and simulation circuit 10 consists of a portion of the circuit components comprising simulation circuit 9. Circuit 9 simulates the operation of the entire LC filter circuit 2 to generate an estimated current value i* from the actual voltage drop u across the LC filter circuit. Similarly, circuit 10 simulates the operation of the capacitor battery alone, represented in FIG. 3 by capacitor C, to generate an estimated voltage drop u* across the LC filter circuit in response to a measured actual value i of the current flow therethrough.

As illustrated in FIG. 4, switch 7 comprises two switch portions 7' and 7", switch portion 7' being connected at one input (the a position input) to isolation transformer 5 for receiving therefrom the measured actual voltage drop u across the LC filter circuit 2. Switch portion 7" is likewise connected at its b position input to isolation transformer 5. The output of switch portion 7' is coupled to the noninverting input of a first differencing circuit 21 in turn having an output linked to the noninverting input of a second differencing circuit 22 and to a proportional amplifier 23. The second differencing circuit is tied at its output to an integrator 24 having an output connected to the inverting input of the second differencing circuit 22 via a proportional amplifier 25. The output of integrator 24, as well as the output of amplifier 23, are connected to respective inputs of an adder 26 which feeds an estimated value of the current flow through the LC filter circuit 2 to an a position input of switch portion 7" and to an a position input of a switch portion 8' of double-throw switch 8. The output of switch portion of 8' is connected to a non-inverting input of a differencing circuit 27 having an output working into an integrator 28. The output of integrator 28 is operatively tied indirectly to an inverting input of differencing circuit 27 via a proportional amplifier 29 and directly to a b position input of switch portion 7', to an inverting input of differencing circuit 21 and to a b position input of a switch portion 8" of switch 8. Isolation transformer 6, (FIG. 2) is connected to a b position input of switch portion 8' and to an a position input of switch portion 8" for delivering thereto a signal i indicating the actual current flow through LC filter circuit 2. Switch portions 7" and 8" are connected at their outputs to filters 11 and 12, respectively. As indicated in FIG. 4, integrator 24 and amplifiers 25 and 23 simulate the action of inductor L, resistor R and current source H, respectively, while integrator 28 and amplifier 29 simulate the operation of capacitor C and current source G (See FIG. 3).

Figure 5:
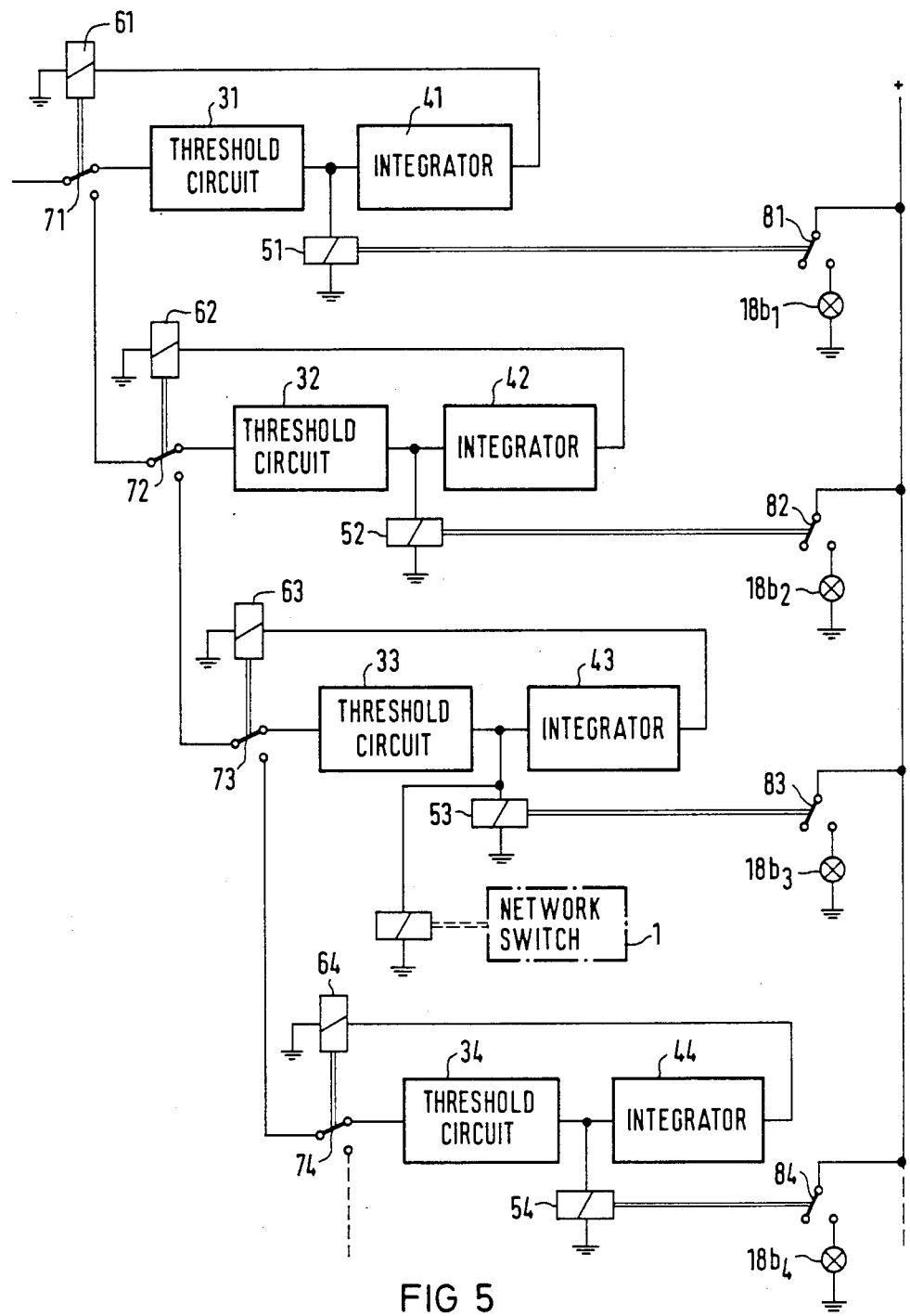
FIG. 5 is a block diagram of a limit and counting stage illustrated in FIG. 1.

As illustrated in FIG. 5, a limit and counting stage (e.g. stage 18), may incorporate a plurality of threshold or limit circuits 31, 32, 33 and 34 which are triggerable by voltages having the same polarity but different magnitudes, threshold circuit 34 being triggered by a voltage having an absolute magnitude greater than that of the voltage at which threshold circuit 33 is triggered. Similarly, the threshold of circuit 33 is greater than that of circuit 32 which in turn has a greater threshold than circuit 31. Each threshold circuit 31–34 is connected at its output to a respective integrator 41, 42, 43 and 44 and to a respective relay 51, 52, 53 and 54. The integrators 41–44 in turn have their outputs coupled to respective relays 61, 62, 63 and 64 for energizing the same to change the position of respective double-throw switches 71, 72 73 and 74.

Switch 71 is connected at an input to delay circuit 16. Upon the appearance at the output of delay circuit 16 of a voltage having a given polarity and an absolute magnitude greater than the threshold of circuit 31, this circuit generates a signal which energizes relay 51 and thereby changes the position of a switch 81 to enable current to flow through an indicator light $18b_1$. Upon the elapse of a predetermined interval, integrator 41 energizes relay 61 to shift the position of switch 71. If the magnitude of the voltage at the output of delay circuit 16 is greater than the threshold of circuit 32, this circuit energizes relay 52 and thereby changes the position of a switch 82, enabling current to flow through an indicator light $18b_2$. After an interval of time determined by the integration constant of integrator 42, that unit energizes relay 62 to shift the position of switch 72. If the voltage at the output of delay circuit 16 has an absolute magnitude greater than the threshold of limit circuit 33, that circuit energizes relay 53, thereby repositioning a double-throw switch 83 to enable current flow through an indicator light $18b_3$. The activation of threshold circuit 33 also energizes a relay 55 connected to network switch 1 for opening a switch contact thereof to interrupt the flow of current through the LC filter circuit 2 being monitored by the device of FIG. 2. At the termination of a time period determined by the integration constant of intergrator 43, relay 63 is energized to reposition switch 73 and thereby enable the application to threshold circuit 34 of the voltage level at the output of delay circuit 16. Threshold circuit 34, relay 54 and a switch 84 operate in the heretofore described manner to energize an indicator light $18b_4$.

The limit and counting circuit illustrated in FIG. 5 may serve to distinguish among the faults I, II, III and V listed in TABLE I. Network switch 1 is disconnected only upon occurrence of a predetermined fault condition dangerous to the continued operation of the LC filter circuit. Limit and counting stages 17 and 19 may have structures similar to the structure of limit and counting stage 18, as will be clear to one skilled in the art. It is only necessary that limit counting stages 17, 18 and 19 are responsive to threshold voltages of different magnitudes and directions for enabling the selective evaluation of internal faults of the LC filter circuit.

Although the invention has been described in terms of specific embodiments and applications, one of ordinary skill in the art, in light of this teaching, may develop additional embodiments and modifications without departing from the spirit or exceeding the scope of the claimed invention. Accordingly, it is to be understood that the descriptions and illustrations herein are preferred to facilitate comprehension of the invention and should not be construed to limit the scope thereof.

What is claimed is:

1. A monitoring device operatively connectable to an electrical device for evaluating internal faults therein causing changes in impedance, said electrical device being connected to an electrical supply network via a network switch, said monitoring device comprising in combination:

first measuring means operatively couplable to the electrical device for sensing a voltage drop thereacross;

second measuring means operatively couplable to said electrical device for sensing a current flow therethrough;

equivalent circuit means operatively linked to said first and said second measuring means for generating estimated values of said voltage drop and said current flow from actual values of said current flow and of said voltage drop, respectively;

filter means operatively connected to said equivalent circuit means for filtering out fundamental frequencies of said estimated values and said actual values of said voltage drop and said current flow;

rectifier means operatively coupled to said filter means for converting said fundamental frequencies into amplitude-proportional direct-current voltages;

nonlinear control means including a transient comparator circuit operatively tied to said rectifier means for comparing a direct-current voltage corresponding to the estimated value of said voltage drop with a direct-current voltage corresponding to the actual value of said voltage drop, for comparing a direct-current voltage corresponding to the estimated value of said current flow with a direct-current voltage corresponding to the actual value of said current flow, and for generating signals upon detecting a substantially sudden deviation between the respective compared values; and indicator and trip means operatively tied to said nonlinear control means for generating in response to signals therefrom an operator alert signal indicative of the functional status of said electrical device and for opening the network switch and thereby disconnecting said electrical device from the supply network upon the occurrence of a predetermined fault condition, said indicator and trip means including a multiplicity of independently operating limit and counting stages operatively and permanently connected in a Y-type configuration to a common output of said transient comparator circuit and responsive to respective threshold voltages of predetermined different magnitudes and directions for enabling the selective evaluation of internal faults of said electrical device simultaneously by said limit and counting stages.

2. The monitoring device defined in claim 1, wherein said electrical device comprises an LC filter circuit including a capacitor battery and an inductor choke connected in series to one another, said capacitor battery including a plurality of capacitor circuits connected in series to one another, each of said capacitor circuits including a plurality of capacitor components connected in parallel to one another, said equivalent circuit means including a first intermediate circuit connectable to said first measuring means for simulating the operation of said LC filter circuit and a second intermediate circuit connectable to said second measuring means for simulating the operation of said capacitor battery, said equivalent circuit means further including switch means operatively linked to said first measuring and said second measuring means and said first and said second intermediate circuit for alternatively linking said first measuring means to said first intermediate circuit and said second measuring means to said second intermediate circuit.

3. The monitoring device defined in claim 1 or 2 wherein said indicator and trip means comprises a multiplicity of indicating devices operatively coupled to respective ones of said limit and counting stages, said indicator and trip means further comprising a multiplicity of tripping devices operatively linked to said network switch and to respective ones of said limit and counting stages.

4. The monitoring device defined in claim 1 or 2, further comprising means including a time delay circuit connected on one side to said nonlinear control means and on another side to said indicator and trip means for preventing brief disturbances in the operation of said electrical device from causing errors in the evaluation of internal faults of said electrical device.

5. The monitoring device defining in claim 1 or 2, wherein said equivalent circuit means includes coupling transformers coupled to said first and said second measuring means.

* * * * *